United States Patent
Yamagata et al.

(10) Patent No.: US 7,312,006 B2
(45) Date of Patent: Dec. 25, 2007

(54) PIGMENT DISPERSION COMPOSITION FOR COLOR FILTER, PRODUCTION METHOD THEREOF, AND COLOR FILTER FOR DISPLAY

(75) Inventors: Hideaki Yamagata, Tokyo-to (JP); Takehide Kishimoto, Tokyo-to (JP); Takashi Nishimoto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 11/521,244

(22) Filed: Sep. 14, 2006

(65) Prior Publication Data

US 2007/0065736 A1    Mar. 22, 2007

Related U.S. Application Data

(63) Continuation of application No. 10/316,414, filed on Dec. 11, 2002, now Pat. No. 7,166,394, which is a continuation-in-part of application No. 09/870,974, filed on May 31, 2001, now Pat. No. 6,514,644.

(30) Foreign Application Priority Data

Jun. 1, 2000    (JP) .............................. 2000-163989

(51) Int. Cl.
*G02B 5/20*    (2006.01)

(52) U.S. Cl. .................... 430/7; 430/270.1; 430/287.1; 106/31.85; 106/31.86

(58) Field of Classification Search ..................... None
See application file for complete search history.

(56) References Cited

U.S. PATENT DOCUMENTS

| | | | | |
|---|---|---|---|---|
| 6,140,016 A | * | 10/2000 | Suzuki et al. | ............ 430/281.1 |
| 6,514,644 B2 | * | 2/2003 | Yamagata et al. | ............ 430/7 |
| 7,166,394 B2 | * | 1/2007 | Yamagata et al. | ............ 430/7 |

FOREIGN PATENT DOCUMENTS

JP    11-209558 A    *    8/1999

* cited by examiner

*Primary Examiner*—John A. McPherson
(74) *Attorney, Agent, or Firm*—Ladas & Parry LLP

(57) ABSTRACT

The present invention is to provide a pigment dispersion composition for a color filter having the excellent pigment dispersing property and dispersion stability, good developing property and reactivity, and an extremely small residue generation amount after development, a production method capable of stably producing such a pigment dispersion composition, and a color filter for a display having a high transmittance and a low light scattering property. A pigment dispersion composition for a color filter containing at least a pigment, a pigment dispersing agent, a binder resin, a reactive compound, and a solvent, wherein the binder resin is a compound having a pigment adsorbing block containing a pigment adsorbing group and not containing a reactive group, and a reactive block containing a reactive group and not containing a pigment adsorbing group, is provided.

9 Claims, No Drawings

PIGMENT DISPERSION COMPOSITION FOR COLOR FILTER, PRODUCTION METHOD THEREOF, AND COLOR FILTER FOR DISPLAY

BACKGROUND OF THE INVENTION

The present invention relates to a color filter to be used for a flat display, such as a liquid crystal display, a plasma display, a field emission display, and an electro luminescence panel, a pigment dispersion composition used for the production thereof, and a production method of the pigment dispersion composition.

Conventionally, a color filter having a coloring layer formed, using a composition with a pigment dispersed has been used as a color separation filter for a flat display, such as a liquid crystal display (LCD), a plasma display (PDP), a field emission display (FED), and an electro luminescence panel (EL). For example, in the case of the LCD, a color filter comprising a coloring layer with an organic pigment dispersed and contained, and a black matrix with a black pigment dispersed and contained is used.

As a pigment dispersion composition for a color filter, following compositions have been used conventionally as ultraviolet ray curing type compositions, and thermosetting type compositions.

(Ultraviolet Ray Curing Type)
  pigment
  pigment dispersing agent
  binder resin
  polyfunctional monomer
  photo polymerization initiator
  resin having an epoxy group (as needed)

(Thermosetting Type)
  pigment
  pigment dispersing agent
  binder resin
  resin having an epoxy group
  hardening accelerator Since a high transmittance and a low light scattering property are required for a color filter of a flat display, a pigment dispersion composition for a color filter should maintain a stable state by dispersion a pigment to a primary particle. A pigment dispersing agent to be used for the above-mentioned pigment dispersion compositions is for dispersing a pigment to a primary particle for stabilizing the state thereof. As examples thereof, those mainly having a pigment dispersing function (Japanese Patent Application Laid Open Nos. 5-611196, 5-247354, 10-300919, or the like), and those having both pigment dispersing property and alkaline developing property (Japanese Patent No. 2,665,696, Japanese Patent Application Laid Open Nos. 10-46042, 11-33383, or the like) are known. These pigment dispersing agents have the kind of a contained functional group, and the kind of a monomer limited. In either of the pigment dispersing agents, use of a binder resin having a reactivity or an alkaline developing property is the premise thereof.

As a binder resin having an alkaline developing property, a binder resin with a higher-order structure comprising a block having an acid group and a block without an acid group defined is disclosed (Japanese Patent Application Laid Open No. 5-273411).

Moreover, as a binder resin having a reactivity and an alkaline developing property, one having a reactive group introduced using an unsaturated group and an alicyclic epoxy compound (Japanese Patent Application Laid Open No. 8-262221), one having the introduction position of an ethylenically unsaturated group defined (Japanese Patent Application Laid Open No. 5-19467), and the like are disclosed.

In contrast, as a conventional production method of a pigment dispersion composition, a method of mechanically kneading a pigment, a pigment dispersing agent, a solvent and a binder resin (Japanese Patent Application Laid Open No. 7-13016), a method of mixing a dispersion material of a 0.3 μm or less average particle size produced by processing a pigment, a low molecular weight binder, a solvent, and a dispersing agent with a dispersing machine such as a bead mill, and a three roll mill, and a photosensitive resin composition containing a high molecular weight binder (Japanese Patent Application Laid Open No. 9-134004), and the like are disclosed.

In the case of dispersing an organic pigment to the primary particle state only by a pigment dispersing agent in a pigment dispersion composition for a color filter, although it is stable as a pigment dispersing agent, a problem of the pigment aggregation is involved due to insufficiency of the compatibility of the other resin components such as a binder resin, or the like with the pigment dispersing agent, and a problem is involved in that the residue amount after development in a photolithography step is large due to increase of the pigment dispersing agent amount contained in the pigment dispersion composition, and it gives an adverse effect as an impurity on the display reliability of the display, or the patterning performance is deteriorated.

In order to solve the problems, a binder resin having a pigment dispersing function is used. Since such a binder resin is adsorbed on the organic pigment surface, the addition amount of the pigment dispersing agent can be made smaller, and thus the residue amount after development in a photolithography step can be reduced.

However, in the case of using such a binder resin having a pigment dispersing function, a problem of deterioration of the dispersion stability is involved due to reduction of the addition amount of the pigment dispersing agent. Moreover, since both of a binder resin having a bonding function inherent to a binder resin, and a binder resin having a pigment dispersing function need to be used together, problems are involved in that the bonding function by the binder resin is deteriorated relatively, and in that the compatibility of the two binder resins to be used should be taken into consideration and thus the resin design is difficult.

Moreover, according to the production method of a pigment dispersion composition described above, problems are involved in that the particle size distribution of a pigment dispersion material processed with a bead mill is made larger, and in that the process time for obtaining a desired particle size distribution is long. Furthermore, problems are involved in that the temperature can be raised due to continuation of the dispersing process so as to raise the viscosity of the pigment dispersion material so that the viscosity of the final composition cannot be set at a desired viscosity, or in that an excessive pressure amount is generated inside the dispersing machine so that the device is stopped or damaged.

Moreover, even in the case the particle size of the pigment dispersion material dispersed by a bead mill is small, the mixing operation of the resin component and the pigment dispersion material is executed unevenly only by dispersing with a roll mill after mixing with the other resin components by an ordinary agitating machine, and thus a problem is involved in that the resin and the pigment are separated, or a long time is needed for the dispersing operation.

SUMMARY OF THE INVENTION

In view of the above-mentioned circumstances, the present invention has been achieved. An object thereof is to provide a pigment dispersion composition for a color filter having the excellent pigment dispersing property and dispersion stability, good developing property and reactivity, and an extremely small residue generation amount after development, a production method capable of stably producing such a pigment dispersion composition, and a color filter for a display having a high transmittance and a low light scattering property.

In order to achieve the object, a pigment dispersion composition for a color filter according to the present invention contains at least an organic pigment, a pigment dispersing agent, a binder resin, a reactive compound, and a solvent, wherein the binder resin is a compound having a pigment adsorbing block containing a pigment adsorbing group and not containing a reactive group, and a reactive block containing a reactive group and not containing a pigment adsorbing group. And also, the organic pigment has the average particle size of 0.15 µm or less.

Furthermore, according to a pigment dispersion composition for a color filter of the present invention, the pigment adsorbing block is a trunk polymer with the pigment adsorbing group being at least one selected from the group consisting of a carboxymethyl group, a sulfonic group, a sulfuric acid group, a phosphonic acid group, a phosphoric acid group, an amino group, and a group containing an aromatic ring, and the reactive block is a branch polymer with a molecular weight in a range from 3,000 to 20,000, having at least a reactive group in a 3,000 to 20,000 molecular weight range from the bonding point with the pigment adsorbing block.

Moreover, according to a pigment dispersion composition for a color filter of the present invention, the binder resin molecular weight in the above-mentioned pigment dispersion composition is in a range from 10,000 to 50,000, and the reactive block has an unsaturated double bond in a reactive group as well as contains a carboxyl group, the reactive block further contains a hydroxyl group, the reactive compound is a photo reactive compound and/or a thermally reactive compound, having a polyfunctional monomer with an unsaturated double bond, or the reactive compound further contains an epoxy group.

Furthermore, according to a pigment dispersion composition for a color filter of the present invention, in the above-mentioned pigment dispersion composition, a polyvalent carboxylic acid group or an acid anhydride is further contained, the binder resin has an epoxy group as a reactive group of the reactive block, and the reactive compound is a photo reactive compound and/or a thermally reactive compound containing an epoxy group.

A production method of a pigment dispersion composition for a color filter according to the present invention is a method for producing the above-mentioned pigment dispersion composition for a color filter, wherein a pigment dispersion material of a 0.15 µm or less average particle size produced by kneading a mixture of an organic pigment, a pigment dispersing agent, a binder resin, and a solvent by an annular type medium dispersing machine using ceramic beads of a 0.5 mm or less diameter, and a reactive composition containing a reactive compound and as needed a solvent, are mixed.

Moreover, according to a production method of a pigment dispersion composition for a color filter of the present invention, the mixing operation for the pigment dispersion material and the reactive composition comprises a step of mixing by a kneading machine having a plurality of rotation axes and a frame type blade, and a step of dispersing by a bead mill using ceramic beads of a 0.5 to 2 mm diameter, and further a dispersion step by a three rolls mill after the dispersion steps.

A color filter for a display according to the present invention comprises a supporting member, and a plurality of coloring layers formed on the supporting member by a predetermined pattern, wherein the coloring layers are formed with the above-mentioned pigment dispersion composition for a color filter.

Since a binder resin contained in a pigment dispersion composition according to the present invention sufficiently provides a function of adsorbing a pigment by a pigment adsorbing block thereof via a pigment adsorbing group, the pigment can be dispersed to a primary particle so that a reactive block can sufficiently perform a reactive function so as to bond with a reactive compound. Therefore, the pigment can be held stably in the state dispersed to the primary particle. Moreover, an annular type medium dispersing machine using ceramic beads of a 0.5 mm or less diameter can make the average particle size of the pigment dispersion material 0.15 µm or less in the production stage. Since the pigment adsorbing block of the binder resin adsorbs the pigment in the pigment dispersion material as well as the reactive block of the binder resin can bond with the reactive compound in the mixing operation with a reactive compound, aggregation of the organic pigment, and separation of the pigment dispersion material and the reactive compound can be prevented.

As heretofore described in detail, according to the present invention, since a pigment dispersion composition containing at least a pigment, a pigment dispersing agent, a binder resin, a reactive compound, and a solvent is provided, and the binder resin is a compound having a pigment adsorbing block containing a pigment adsorbing group and not containing a reactive group, and a reactive block containing a reactive group and not containing a pigment adsorbing group, the pigment adsorbing block and the reactive block can sufficiently provide the function per each block. Since the pigment adsorbing block of the binder resin adsorbs a pigment via a pigment adsorbing group, the pigment can be dispersed to a primary particle so that the pigment can be held stably in the dispersed state. Moreover, since the reactive block can be bonded with the reactive compound, the binder resin bonding function can be provided sufficiently. Thereby, a good compatibility can be obtained among the pigment, the binder resin, and the reactive compound. Moreover, since the content of the pigment dispersing agent can be reduced so that the resin component content is increased relatively, the residue amount after development in the photolithography step can be reduced so as to improve the film forming property (sensitivity, developing property). Furthermore, the strength, the heat resistance, and the chemical resistance of the film after formation can be improved as well as a high display reliability can be realized. Moreover, an annular type medium dispersing machine using ceramic beads of a 0.5 mm or less diameter can make the average particle size of the pigment dispersion material 0.15 µm or less in the production stage. Since the pigment adsorbing block of the binder resin adsorbs the pigment in the pigment dispersion material as well as the reactive block of the binder resin can bond with the reactive compound, aggregation of the pigment, and separation of the pigment dispersion material and the reactive composition can be prevented in the mixing operation of the pigment dispersion material and the reactive composition. A coloring layer formed using a pigment dispersion composition according to the present invention provides a color filter for a flat display having a small average particle size of the contained pigment, a high transmittance and a low light scattering property.

DESCRIPTION OF THE PREFERRED EMBODIMENTS

Hereinafter, best modes of the present invention will be explained.

(Pigment Dispersion Composition for a Color Filter)

A pigment dispersion composition for a color filter according to the present invention contains at least an organic pigment, a pigment dispersing agent, a binder resin, a reactive compound, and a solvent, wherein the binder resin is a compound having a pigment adsorbing block containing a pigment adsorbing group and not containing a reactive group, and a reactive block containing a reactive group and not containing a pigment adsorbing group. Hereinafter, each component comprising the pigment dispersion composition for a color filter according to the present invention will be described.

Organic Pigment

As an organic pigment composing a pigment dispersion composition for a color filter according to the present invention is not particularly restricted. For an example, a chromatic color organic pigment, that is, an organic pigment having its absorbing wavelength band and transmitting wavelength band within the visible light band can be used. Specifically, well known red pigments, yellow pigments, green pigments, blue pigments, violet pigments, or the like can be used. Specific examples of the organic pigments can be shown by the color index numbers; examples of the red pigments include the C. I. Pigment Red 177, the C. I. Pigment Red 48:1, and the C. I. Pigment Red 254; examples of the yellow pigments include the C. I. Pigment Yellow 83, the C. I. Pigment Yellow 138, the C. I. Pigment Yellow 139, and the C. I. Pigment Yellow 150; examples of the green pigments include the C. I. Pigment Green 7, and the C. I. Pigment Green 36; examples of the blue pigments include the C. I. Pigment Blue No. 15s, the C. I. Pigment Blue 1, the C. I. Pigment Blue 19, the C. I. Pigment Blue 60, and the C. I. Pigment Blue 61; examples of the violet pigments include the C. I. Pigment Violet 23; or the like.

The average particle size of the above-mentioned organic pigments is in a range of 0.01 to 0.5 μm, preferably 0.01 to 0.15 μm. The solid component content in the composition is preferably about 5 to 80% by weight. In the present invention, the "solid component" denotes the organic pigment, the pigment dispersing agent, the binder resin and the reactive compound. The same is applied to the description provided below.

Pigment Dispersing Agent

As a pigment dispersing agent composing a pigment dispersion composition for a color filter according to the present invention, known pigment dispersing agent can be used. Specifically, polymer dispersing agents such as a modified polyurethane, a modified polyacrylate, a modified polyester, and a modified polyamide, and surfactants such as an ester phosphate, an alkyl amine, and a polyoxy ethylene alkyl phenyl ether, or the like, can be presented.

These pigment dispersing agents are contained in the solid component of a composition preferably in a range of about 5 to 50% by weight. According to a pigment dispersion composition for a color filter of the present invention, since a binder resin comprises a pigment adsorbing block so as to provide the pigment dispersing function, the pigment dispersing agent content can be reduced drastically compared with the conventional pigment dispersing compositions.

Binder Resin

A binder resin composing a pigment dispersion composition for a color filter according to the present invention is, as mentioned above, a compound having a pigment adsorbing block containing a pigment adsorbing group and not containing a reactive group, and a reactive block containing a reactive group and not containing a pigment adsorbing group. Therefore, the pigment adsorbing block and the reactive block can provide each function sufficiently per each block.

In contrast, in the case of a binder resin with a pigment adsorbing group and a reactive group arranged irregularly, since the entirety of the binder resin adsorbs on the pigment surface, the reactive group is scattered on the pigment surface so that the reactivity is deteriorated. Moreover, since the density of the pigment adsorbing group is lowered, the pigment adsorbing force is made lower.

According to the present invention, as a pigment adsorbing group contained in the pigment adsorbing block of the binder resin, a carboxymethyl group, a sulfonic group, a sulfuric acid group, a phosphonic acid group, a phosphoric acid group, an amino group, and a group containing an aromatic ring, or the like can be presented. Moreover, the reactive block has a molecular weight of 3,000 or more, preferably in a range from 3,000 to 20,000. With a reactive block molecular weight of less than 3,000, the reactivity among molecules is deteriorated, and thus it is not preferable.

According to the present invention, by disposing the reactive block at a molecular chain end, the reactivity can further be improved.

Moreover, according to the present invention, it is preferable that the pigment adsorbing block is a trunk polymer having at least one of the above-mentioned pigment adsorbing groups, and the reactive block is a branch polymer with a molecular weight in a range from 3,000 to 20,000, having at least a reactive group having a molecular weight of 3,000 or more, preferably, in a 3,000 to 20,000 molecular weight range from the bonding point with the pigment adsorbing block. In the case the reactive group exists at a position of less than 3,000 molecular weight from the bonding point, drastic improvement of the reactivity cannot be achieved.

As the above-mentioned trunk polymers, for example, those having a structure unit such as an acrylic acid, a methacrylic acid, a methyl methacrylate, a benzyl methacrylate, a dimethyl amino ethyl methacrylate, a styrene, or the like, can be presented.

Moreover, as the above-mentioned branch polymers, for example, those having a structure unit such as an acrylic acid, a methacrylic acid, a methyl methacrylate, a benzyl methacrylate, a dimethyl amino ethyl methacrylate, a styrene, an ε-caprolactone, an ε-caprolactam, or the like, can be presented.

According to the binder resin having a reactive block disposed at a molecular chain end, and the binder resin having a pigment adsorbing block as a trunk polymer and a reactive block as a branch polymer, since the pigment adsorbing block adsorbing on the pigment surface exists in a wide space area away from the reactive block so that it can be moved easily, the reactivity with a reactive compound is improved. For example, the binder resin itself bonds with a network of a reactive compound so that a further firmer network can be formed. In contrast, according to a binder resin having a reactive block inserted in a molecular chain, in the case the pigment adsorbing block adsorbs on the pigment surface, the reactive block exists only in the vicinity of the pigment surface, and thus there is a limitation in improvement of the reactivity with the reactive compound.

As mentioned above, the molecular weight of the binder resin comprising a reactive block and a pigment adsorbing block can be in a range from 10,000 to 50,000, preferably in a range from 20,000 to 40,000. In the case the molecular weight is less than 10,000, the dispersion property is deteriorated, and thus it is not preferable. In contrast, in the case the molecular weight is more than 50,000, the edge precision in the pattern formation in a photolithography step is lowered as well as the time needed for development is prolonged, and thus it is not preferable.

A reactive group comprising the reactive block has an unsaturated double bond as well as contains a carboxyl group, and further, the reactive block may contain a hydroxyl group as needed. Examples of the reactive group include an acryloyl group, a methacryloyl group, and a vinyl group.

Moreover, according to the present invention, the reactive block may comprise an epoxy group as a reactive group. In this case, as the reactive compound, a photo reactive compound and/or a thermally reactive compound containing an epoxy group is used, and further, as the curing agent, at least one of a polyvalent carboxylic acid (a trimellitic acid, a phthalic acid, or the like), an acid anhydride thereof, a 2,4,6-tris(N,N-dimethyl amino methyl) phenol, or the like, is contained.

The binder resin is contained in the solid component of a composition preferably in a range of about 5 to 80% by weight.

Reactive Compound

A reactive compound composing a pigment dispersion composition for a color filter according to the present invention, is a photo reactive compound and/or a thermally reactive compound having a polyfunctional monomer with an unsaturated double bond, and it can further contain an epoxy group as needed. As the polyfunctional monomer, an allyl acrylate, a benzyl acrylate, a butoxy ethyl acrylate, a butoxy ethylene glycol acrylate, a cyclohexyl acrylate, a dicyclopentanyl acrylate, a 2-ethyl hexyl acrylate, a glycerol acrylate, a glycidyl acrylate, a 2-hydroxy ethyl acrylate, a 2-hydroxypropyl acrylate, an isobonyl acrylate, an isodexyl acrylate, an isooctyl acrylate, a lauryl acrylate, a 2-methoxy ethyl acrylate, a methoxy ethylene glycol acrylate, a phenoxy ethyl acrylate, a stearyl acrylate, an ethylene glycol diacrylate, a diethylene glycol diacrylate, a 1,4-butane diol diacrylate, a 1,5-pentane diol diacrylate, a 1,6-hexane diol diacrylate, a 1,3-propane diol acrylate, a 1,4-cyclohexane diol diacrylate, a 2,2-dimethylol propane diacrylate, a glycerol diacrylate, a tripropylene glycol diacrylate, a glycerol triacrylate, a trimethylol propane triacrylate, a polyoxy ethylated trimethylol propane triacrylate, a pentaerythritol triacrylate, a pentaerythritol tetraacrylate, a triethylene glycol diacrylate, a polyoxy propyl trimethylol propane triacrylate, a butylene glycol diacrylate, a 1,2,4-butane triol triacrylate, a 2,2,4-trimethyl-1,3-pentane diol diacrylate, a diallyl fumarate, a 1,10-decane diol dimethyl acrylate, a pentaerythritol hexaacrylate, a dipentaerythritol hexaacrylate, those having the above-mentioned acrylate replaced by a methacrylate, a γ-methacryloxy propyl trimethoxy silane, a 1-vinyl-2-pyrrolidone, or the like, can be presented. In the present invention, one of the above-mentioned polyfunctional monomers, a mixture of two or more, or a mixture with the other compounds can be used.

Moreover, as mentioned above, as a reactive compound, a photo reactive compound and/or a thermally reactive compound having an epoxy group can be contained. Examples of the reactive compound include a bisphenol A type epoxy resin, a bisphenol F type epoxy resin, a phenol novolak type epoxy resin, a cresol novolak type epoxy resin, a glycidyl (meth)acrylate, and an acrylic copolymer containing an alicyclic epoxy (meth)acrylate, or the like in a resin skeleton.

The reactive compound is contained in a solid component of a composition preferably in a range of about 5 to 80% by weight.

Solvent

As a solvent to be used for a pigment dispersion composition for a color filter according to the present invention, for example, anones such as a methanol, an ethanol, an isopropanol, an acetone, a methyl ethyl ketone, a toluene, a xylene, and a cyclohexanone, a methylene chloride, a 3-methoxy-butyl acetate, ethylene glycol monoalkyl ethers, ethylene glycol dialkyl ethers, diethylene glycol monoalkyl ethers, diethylene glycol monoalkyl ether acetates, propylene glycol monoalkyl ether acetates, terpenes such as an α- or β-terpineol, or the like can be presented.

Moreover, in a pigment dispersion composition for a color filter according to the present invention, as an additive, a photo polymerization initiator, a sensitizer, a polymerization stopping agent (terminator), a chain transfer agent, a levering agent, a dispersing agent, a plasticizing agent, a surfactant, an antifoaming agent, or the like, can be used as needed. As the photo polymerization initiator, a benzophenone, an o-benzoyl methyl benzoate, a 4,4-bis(dimethyl amine) benzophenone, a 4,4-bis(diethyl amine) benzophenone, an α-amino.acetophenone, a 4,4-dichloro benzophenone, a 4-benzoyl-4-methyl diphenyl ketone, a dibenzyl ketone, a fluorenone, a 2,2-diethoxy acetophenone, a 2,2-dimethoxy-2-phenyl acetophenone, a 2-hydroxy-2-methyl propiophenone, a p-tert-butyl dichloro acetophenone, a thioxanthone, a 2-methyl thioxanthone, a 2-chloro thioxanthone, a 2-isopropyl thioxanthone, a diethyl thioxanthone, a benzyl dimethyl ketal, a benzyl methoxy ethyl acetal, a benzoin methyl ether, a benzoin butyl ether, an anthraquinone, a 2-tert-butyl anthraquinone, a 2-amyl anthraquinone, a β-chlor anthraquinone, an anthrone, a benzanthrone, a dibenzsuberone, a methylene anthrone, a 4-azido benzyl aceto phenone, a 2,6-bis(p-azido benzylidene) cyclo hexane, a 2,6-bis(p-azido benzylidene)-4-methyl cyclo hexanone, a 2-phenyl-1,2-butadion-2-(o-methoxy carbonyl) oxime, a 1-phenyl-propane dion-2-(o-ethoxy carbonyl) oxime, a 1,3-diphenyl-propane trion-2-(o-ethoxy carbonyl) oxime, a 1-phenyl-3-ethoxy-propane trion-2-(o-benzoyl) oxime, a Michler's ketone, a 2-methyl-[4-(methyl thio) phenyl]-2-morphorino-1-propane, a naphthalene sulfonyl chloride, aquinoline sulfonyl chloride, an-phenyl thioacrydone, a 4,4-azobis isobutyronitrile, a diphenyl disulfide, a benzthiazol disulfide, a triphenylphosphine, a camphor quinone, a carbon tetrabromide, a tribromo phenyl sulfone, a benzoin peroxide, an eosin, a combination of a photo reducing coloring matter such as a methylene blue and a reducing agent such as an ascorbic acid, a triethanol amine, or the like, can be presented. In the present invention, one or two or more of these photo polymerization initiators can be used.

In the case of applying the above-mentioned pigment dispersion composition for a color filter according to the present invention by, for example, a spin coating method, the viscosity at 30° C. is 20 cp or less, preferably in a range of 2 to 10 cp. In the case of forming a film at a high viscosity, such as in a printing operation, it is 5,000 cp or more, preferably in a range of 10,000 to 100,000 cp. The viscosity is the numerical value measured by a viscometer (produced by Shibaura System Corp., BISUMETORON viscometer VDA-L).

(Production Method of a Pigment Dispersion Composition for a Color Filter)

Next, a production method of a pigment dispersion composition for a color filter according to the present invention will be explained.

In the production method of the present invention, a pigment dispersion composition for a color filter is produced by mixing a pigment dispersion material of produced by kneading a mixture of the above-mentioned pigment, pigment dispersing agent, binder resin, and solvent, and a reactive composition containing the above-mentioned reactive compound and as needed a solvent.

The above-mentioned pigment dispersion material is provided by kneading a mixture of an organic pigment, a pigment dispersing agent, a binder resin, and a solvent by an annular type medium dispersing machine using ceramic beads of a 0.5 mm or less diameter. The average particle size is 0.15 μm or less, preferably in a range of 0.01 to 0.1 μm. In the case the average particle size of the pigment dispersion material is more than 0.15 μm, the light transmittance is lowered. By using the annular type medium dispersing machine for mixing and dispersing a material in a ring-like space between a cylinder and an internal rotating member as the kneading machine, the particle size distribution width of the pigment dispersion material can be narrowed. Moreover, by using the ceramic beads of a 0.5 mm or less diameter as the medium, a pigment dispersion material having a 0.15 μm or less average particle size can be obtained.

In the above-mentioned particle dispersion, since the binder resin adsorbs on the organic pigment surface together with the pigment dispersing agent, when the pigment dispersion material and a reactive composition are mixed, the compatibility between the organic pigment and the resin component is high so that pigment aggregation, separation of the pigment dispersion material and the reactive composition, or the like are not brought about.

The operation of mixing the above-mentioned pigment dispersion material and reactive composition comprises a step of mixing by a kneading machine having a plurality of rotation axes and a frame type blade, and a step of dispersing by a bead mill using ceramic beads. In the case that a one axis propeller agitating machine is used for mixing the pigment dispersion material and the reactive composition, only the portion in the vicinity of the propeller is mixed. However, by using a kneading machine having a plurality of rotation axes and a frame type blade, for example, in the case of a production of a pigment dispersion composition for a color filter suited for the application of forming a film by using a high viscosity material (for example, 5,000 cp or more) as in a printing operation, the agitation of a composition, in particular, having a thixotropic property is enabled. Moreover, in the dispersing step using a bead mill, ceramic beads of a 0.5 mm or more diameter, preferably in a range of 0.5 to 2 mm are used as the medium. In the case the ceramic beads diameter is less than 0.5 mm, the gap among the beads is small so that the dispersion material can hardly pass through, and thus the time needed for obtaining a composition with a narrow particle size distribution width is prolonged.

Furthermore, a dispersion step by a three roll mill may be added after the above-mentioned dispersion steps. Thereby, adjustment of the color characteristic after film formation using the pigment dispersion composition for a color filter can be enabled.

(Color Filter for a Display)

A color filter for a display according to the present invention is to be used for a flat display, such as a liquid crystal display (LCD), a plasma display (PDP), a field emission display (FED), and an electro luminescence panel (EL). For example, in the case of the LCD, or a white light emitting EL, it can be used as a three primary color separating filter. In the case of a PDP, an FED, and an EL, it can be used as a filter for adjusting the purity and the hue of the original three primary colors.

The basic structure of a color filter for a display according to the present invention comprises a supporting member, and a coloring layer of a plurality of colors formed on the supporting member by a predetermined pattern.

For the supporting member, transparent rigid materials without flexibility, such as a quartz glass, a pilex glass, and a synthetic quartz plate, or transparent flexible materials with flexibility, such as a transparent resin film, and an optical resin plate can be used.

The coloring layer can be formed by applying a pigment dispersion composition for a color filter according to the present invention by a conventional application method such as a spin coating, and exposing and developing by a predetermined pattern. Moreover, it can also be formed by printing by a printing method by a desired pattern. The coloring layer includes a combination of three colors of red, green, and blue, a combination of three colors of cyan, magenta, and yellow, or the like.

EXAMPLES

Next, with reference to examples, the present invention will be described in further detail.

Example 1

(1) Preparation of a Binder Resin

The following 6 kinds of binder resins (resins 1 to 6, the molecular weight in each of them=20,000) were prepared.

Resin 1: random copolymer (A+B+C)

Resin 2: straight chain block copolymer (B+C) (A) (B+C)

Resin 3: straight chain block copolymer (A) (B+C) (A)

Resin 4: block copolymer comprising a trunk polymer (AAAAAA . . . ) and a branch polymer (D) (molecular weight of D=1,000)

Resin 5: block copolymer comprising a trunk polymer (AAAAAA . . . ) and a branch polymer (D) (molecular weight of D=3,000)

Resin 6: block copolymer comprising a trunk polymer (AAAAAA . . . ) and a branch polymer (D) (molecular weight of D=5,000)

The above-mentioned A, B, C and D are as follows.

A: a dimethyl amino ethyl methacrylate having an amino group as a pigment adsorbing group B: a reaction product of a methacrylic acid and an epoxy resin having an unsaturated double bond, with an epoxy group as a reactive group C: a benzyl methacrylate D: a macro monomer having a methacryloyl group as a reactive group (2) Preparation of a Pigment Dispersion Composition for a Color Filter Next, using the above-mentioned binder resins, 9 kinds of pigment dispersion compositions for a color filter with the below-mentioned compositions (specimens 1 to 9) were prepared. The preparation was carried out by first, dispersing a pigment, a pigment dispersing agent (not contained in the compositions 2 and 3), a binder resin (not contained in the specimen 1), and a solvent by a sand mill using glass beads of a 1 mm diameter, and dispersing the same by an annular type bead mill using ceramic beads of a 0.3 mm diameter so as to prepare pigment dispersion materials. Thereafter, a reactive composition comprising a reactive compound, an acetophenone based photo polymerization initiator, and a thioxanthone based sensitizer, and the above-mentioned pigment dispersion materials were mixed by a two axes mixer having a frame type blade, and further, mixed by a bead mill.

The viscosity of these pigment dispersion compositions was about 20 cp. The viscosity was measured by a viscometer (produced by Shibaura System Corp., BISUMETORON viscometer VDA-L). Moreover, the amount of the pigment dispersing agent in the specimens 1, and 4 to 9 was determined as an amount when the flowability of the pigment dispersion material is generated by increasing the addition amount of the pigment dispersing agent.

(Specimen 1)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 35 parts by weight |
| reactive compound (dipentaerythritol hexaacrylate) | 165 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 2)

| | |
|---|---|
| red pigment (CHROMOPHTHAL RED A2B produced by Chiba Specialty Chemicals Corp.) | 100 parts by weight |
| binder resin 1 (random copolymer) | 100 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 3)

| | |
|---|---|
| red pigment (CHROMOPHTHAL RED A2B produced by Chiba Specialty Chemicals Corp.) | 100 parts by weight |
| binder resin 6 (trunk branch block copolymer) | 100 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 4)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 31 parts by weight |
| binder resin 1 (random copolymer) | 69 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 5)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 25 parts by weight |
| binder resin 2 (straight chain block copolymer) | 75 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 6)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 26 parts by weight |
| binder resin 3 (straight chain block copolymer) | 74 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 7)

| | |
|---|---|
| red pigment (CHROMOPHTHAL RED A2B produced by Chiba Specialty Chemicals Corp.) | 100 parts by weight |

-continued

| | |
|---|---|
| pigment dispersing agent (SOLSPERSE 24000 produced by Zeneca Co., Ltd.) | 20 parts by weight |
| binder resin 4 (trunk branch block copolymer) | 80 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 8)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 18 parts by weight |
| binder resin 5 (trunk branch block copolymer) | 82 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(Specimen 9)

| | |
|---|---|
| red pigment (CHROMOPHTHAL RED A2B produced by Chiba Specialty Chemicals Corp.) | 100 parts by weight |
| pigment dispersing agent (SOLSPERSE 24000 produced by Zeneca Co., Ltd.) | 18 parts by weight |
| binder resin 6 (trunk branch block copolymer) | 82 parts by weight |
| reactive compound (dipentaerythritol hexaacrylate) | 100 parts by weight |
| solvent (3-methoxy butyl acetate) | 1,400 parts by weight |
| acetophenone based photo polymerization initiator | 40 parts by weight |
| thioxanthone based sensitizer | 10 parts by weight |

(3) Evaluation of the Pigment Dispersion Compositions for a Color Filter

For the 9 kinds of the pigment dispersion compositions (specimens 1 to 9) prepared as mentioned above, the pigment average particle size (immediately after the preparation and after 2 weeks), and the reactivity were measured and evaluated by the following methods. Results are shown in the below-mentioned table 1.

(Measurement Method for the Pigment Average Particle Size)

The pigment dispersion materials obtained in the step of preparing the pigment dispersion compositions diluted by a 3-methoxy butyl acetate to 100 times were measured by a laser doppler type particle size distribution meter (produced by Nikkisou Corp.). Moreover, the dispersion stability was evaluated from the average particle size immediately after the preparation and the average particle size after passage of two weeks.

(Reactivity)

The pigment dispersion compositions were spin coated. After drying, they were irradiated with an ultraviolet ray. The height of the absorption peak by the C═C bond at 810 $cm^{-1}$ was measured before and after the ultraviolet ray irradiation. From the absorption peak ratio of the values before and after the irradiation, the unreacted carbon double bond amount was calculated so as to be indicated by %.

TABLE 1

| Specimen | Used binder resin | Pigment dispersing agent amount (with respect to the pigment 100) | Average particle size of the pigment Immediately after the preparation | Average particle size of the pigment After 2 weeks (dispersion stability) | Unreacted double bond amount (reactivity) |
|---|---|---|---|---|---|
| 1 | — | 35 | 0.1 µm | 0.1 µm | 40% |
| 2 | Resin 1 random copolymer | 0 | 1 µm | 3 µm | 50% |
| 3 | Resin 6 trunk branch block | 0 | 0.4 µm | 0.8 µm | 40% |
| 4 | Resin 1 random copolymer | 31 | 0.1 µm | 0.7 µm | 50% |
| 5 | Resin 2 straight chain block | 25 | 0.1 µm | 0.6 µm | 30% |
| 6 | Resin 3 straight chain block | 26 | 0.1 µm | 0.3 µm | 40% |
| 7 | Resin 4 trunk branch block | 20 | 0.1 µm | 0.1 µm | 27% |
| 8 | Resin 5 trunk branch block | 18 | 0.1 µm | 0.1 µm | 20% |
| 9 | Resin 6 trunk branch block | 18 | 0.1 µm | 0.1 µm | 18% |

In the table 1, the pigment dispersion compositions (specimens 5 to 9) use the binder resins (resins 2 to 6) having a pigment adsorbing block and a reactive block, with a sufficiently small pigment average particle size. It is apparent that the amount of the pigment dispersing agent is small and the reactivity is high (the unreacted carbon double bond amount is small) compared with the pigment dispersion composition (specimen 4) using the binder resin 1 as a random copolymer.

Moreover, among the pigment dispersion compositions (specimens 5 to 9), the pigment dispersion compositions (specimens 7 to 9) using the binder resins (resins 4 to 6) as a trunk branch block copolymer have a further smaller pigment dispersing agent amount, a higher reactivity, and a good dispersion stability. Furthermore, among the pigment dispersion compositions (specimens 7 to 9), the larger the molecular weight of the branch polymer (D) of the binder resin is, the higher the reactivity is. This shows that the reactivity is higher as the reactive group position is farther from the bonding point of the pigment adsorbing block (trunk copolymer AAAAA . . . ) and the branch polymer (D).

Moreover, according to the comparison between the pigment dispersion compositions (specimens 5 and 6), it is apparent that the pigment dispersion composition (specimen 5) using the binder resin (resin 2) comprising a straight chain block copolymer with a reactive block disposed at the end has a higher reactivity.

In contrast, although the pigment dispersion composition (specimen 1) not containing a binder resin has a small pigment average particle size and a good dispersion stability, the pigment dispersing agent amount is large and the reactivity is low.

Moreover, the pigment dispersion compositions (specimens 2 and 3) not containing a pigment dispersing agent have a large pigment average particle size and poor dispersion stability and reactivity.

Example 2

(1) Preparation of a Binder Resin

In the same process as in the example 1, the binder resin 6 (molecular weight=20,000) was prepared.

(2) Preparation of a Pigment Dispersion Composition for a Color Filter

Next, using the above-mentioned binder resin 6, 5 kinds of pigment dispersion compositions for a color filter with the below-mentioned compositions (specimens 10 to 14) were prepared.

(Pigment Dispersion Composition)

| | |
|---|---|
| yellow pigment (PALIOTOL YELLOW D1819 produced by BASF Japan Corp.) | 100 parts by weight |
| pigment dispersing agent (SOLSPERSE 24000 produced by Zeneca Co., Ltd.) | 60 parts by weight |
| binder resin 6 | 40 parts by weight |
| reactive compound (dipentaerythritol hexaacrylate) | 100 parts by weight |
| solvent (3-methoxy butyl acetate) | 1,400 parts by weight |

-continued

| | |
|---|---|
| acetophenone based photo polymerization initiator | 40 parts by weight |
| thioxanthone based sensitizer | 10 parts by weight |

The preparation of the pigment dispersion compositions (specimens 10 to 14) was carried out as follows. First, a pigment, a pigment dispersing agent, the binder resin 6, and a solvent were dispersed by either of the below-mentioned dispersion methods A to E at 25° C. for 5 hours so as to prepare a pigment dispersion material. For the pigment dispersion compositions accordingly obtained, the average particle size and maximum particle size immediately after the preparation, and the average particle size after passage of 2 weeks were measured according to the measurement methods described in the example 1. Results are shown in the below-mentioned table 2. Furthermore, the viscosity of the pigment dispersion materials was measured immediately after the dispersion and after passage of one day by using a viscometer (produced by Shibaura System Corp., BISUMETORON viscometer VDA-L). Results are shown in the below-mentioned table 2.

Dispersion method A: an annular type bead mill was used (bead diameter=0.3 mm).

Dispersion method B: an annular type bead mill was used (bead diameter=0.5 mm).

Dispersion method C: an annular type bead mill was used (bead diameter=1 mm).

Dispersion method D: a disc type bead mill was used (bead diameter=0.3 mm).

Dispersion method E: a jet mill was used.

(The Above-mentioned Bead Material is Zirconium Oxide.)

Thereafter, a reactive composition comprising a reactive compound, an acetophenone based photo polymerization initiator, and a thioxanthone based sensitizer, and the above-mentioned pigment dispersion materials were mixed by a two axes mixer having a frame type blade, and further, mixed by a bead mill so as to obtain the pigment dispersion compositions (specimens 10 to 14).

(3) Evaluation of the Pigment Dispersion Compositions for a Color Filter

For the 5 kinds of the pigment dispersion compositions (specimens 10 to 14) prepared as mentioned above, the pigment average particle size was measured according to the measurement method shown in the example 1. Results are shown in the below-mentioned table 2.

TABLE 2

| Specimen | Dispersion method | Average particle size of the pigment (μm) | | Pigment maximum average particle size (μm) | Viscosity of the pigment dispersion material (cp) | | Average particle size of the pigment dispersion composition (μm) |
|---|---|---|---|---|---|---|---|
| | | Immediately after the preparation | After 2 weeks (dispersion stability) | | Immediately after the preparation | After 1 day (dispersion stability) | |
| 10 | A | 0.1 | 0.1 | 0.3 | 10 | 12 | 0.1 |
| 11 | B | 0.15 | 0.15 | 0.4 | 10 | 12 | 0.15 |
| 12 | C | 0.3 | 0.3 | 0.6 | 12 | 20 | 0.3 |
| 13 | D | 0.1 | 0.2 | 0.8 | 80 | Jelly-like | 0.4 |
| 14 | E | 0.2 | 0.5 | 0.4 | 120 | Jelly-like | 0.7 |

As shown in the table 2, the pigment dispersion materials (specimens 10 and 11) prepared by the dispersion methods A and B by the annular type bead mills using the ceramic beads of the 0.3 mm and 0.5 mm diameters have a 0.15 μm or less average particle size, and a stable dispersion state after passage of 2 weeks. It is apparent that the dispersion stability is good also from the sufficiently low viscosity of 12 cp after passage of one day from the dispersion. Moreover, from the numerical value of the maximum particle size, it is apparent that the particle size distribution width is narrow. Furthermore, it is apparent that the pigment dispersion material state is maintained as to the pigment average particle size even in the pigment dispersion composition state without generation of the pigment aggregation.

On the other hand, although the pigment dispersion material (specimen 12) prepared by the dispersion method C using the ceramic beads of a 1 mm diameter has a good dispersion stability, compared with the pigment dispersion materials (specimens 10 and 11) prepared by the dispersion methods A and B, it is apparent that the pigment average particle size is slightly larger (0.3 μm), and further, from the numerical value of the maximum particle size, the particle size distribution width is slightly wider.

In contrast, although the pigment dispersion material (specimen 13) prepared by the dispersion method D by the disc type bead mill using the ceramic beads of a 0.3 mm diameter has a good pigment average particle size of 0.1 μm immediately after the dispersion, it becomes 0.2 μm after passage of 2 weeks. Moreover, it becomes jelly-like after passage of one day from the dispersion, and thus apparently the dispersion stability is poor. Furthermore, from the numerical value of the maximum particle size, the particle size distribution width is apparently wide. Moreover, the pigment average particle size becomes 0.4 μm in the pigment dispersion composition state, and thus apparently pigment aggregation is generated.

Moreover, although the pigment dispersion material (specimen 14) prepared by the dispersion method E without using ceramic beads as a non-medium dispersion method has a good pigment average particle size of 0.2 μm immediately after the dispersion, it becomes 0.5 μm after passage of 2 weeks. Moreover, it becomes jelly-like after passage of one day from the dispersion, and thus apparently the dispersion stability is poor. Furthermore, the pigment average particle size becomes 0.7 μm in the pigment dispersion composition state, and thus apparently pigment aggregation is generated.

Example 3

(1) Preparation of a Binder Resin

In the same process as in the example 1 except that a carboxyl group and a hydroxyl group were introduced, the below-mentioned 3 kinds of binder resins 7 to 10 were prepared.

Binder resin 7: molecular weight=10,000
Binder resin 8: molecular weight=50,000
Binder resin 9: molecular weight=60,000
Binder resin 10: molecular weight=5,000

(2) Preparation of a Pigment Dispersion Composition for a Color Filter

Next, using the above-mentioned 4 kinds of the binder resins, 4 kinds of pigment dispersion compositions for a color filter (specimens 15 to 18) with the below-mentioned compositions each comprising a set of three colors for a red pixel, a green pixel, and a blue pixel were prepared.

| (Pigment dispersion composition for a red pixel) | |
|---|---|
| red pigment | 80 parts by weight |
| (CHROMOPHTHAL RED A2B produced by Chiba Specialty Chemicals Corp.) | |
| yellow pigment | 20 parts by weight |
| (PALIOTOL YELLOW D1819 produced by BASF Japan Corp.) | |
| pigment dispersing agent | 50 parts by weight |
| (SOLSPERSE 24000 produced by Zeneca Co., Ltd.) | |
| binder resin | 50 parts by weight |
| reactive compound | 80 parts by weight |
| (dipentaerythritol hexaacrylate) | |
| reactive compound - cresol novolak type epoxy resin | 20 parts by weight |
| (EPICOAT 180S70 produced by Yuka Shell Epoxy Corp.) | |
| solvent (3-methoxy butyl acetate) | 1,400 parts by weight |
| acetophenone based photo polymerization initiator | 40 parts by weight |
| thioxanthone based sensitizer | 10 parts by weight |
| (Pigment dispersion composition for a green pixel) | |
| green pigment | 70 parts by weight |
| (MONASTRAL GREEN 9Y-C produced by Zeneca Co., Ltd.) | |
| yellow pigment | 30 parts by weight |
| (PALIOTOL YELLOW D1819 produced by BASF Japan Corp.) | |
| pigment dispersing agent | 50 parts by weight |
| (SOLSPERSE 24000 produced by Zeneca Co., Ltd.) | |
| binder resin | 50 parts by weight |
| reactive compound | 80 parts by weight |
| (dipentaerythritol hexaacrylate) | |
| reactive compound - cresol novolak type epoxy resin | 20 parts by weight |
| (EPICOAT 180S70 produced by Yuka Shell Epoxy Corp.) | |
| solvent (3-methoxy butyl acetate) | 1,400 parts by weight |
| acetophenone based photo polymerization initiator | 40 parts by weight |
| thioxanthone based sensitizer | 10 parts by weight |
| (Pigment dispersion composition for a blue pixel) | |
| blue pigment | 100 parts by weight |
| (HELIOGEN BLUE L6700F produced by BASF Japan Corp.) | |
| phthalocyanine based pigment derivative | 10 parts by weight |
| (SOLSPERSE 5000 produced by Zeneca Co., Ltd.) | |
| pigment dispersing agent | 40 parts by weight |
| (SOLSPERSE 24000 produced by Zeneca Co., Ltd.) | |
| binder resin | 60 parts by weight |
| reactive compound | 80 parts by weight |
| (dipentaerythritol hexaacrylate) | |
| reactive compound - cresol novolak type epoxy resin | 20 parts by weight |

| | | |
|---|---:|---|
| (EPICOAT 180S70 produced by Yuka Shell Epoxy Corp.) | | |
| solvent (3-methoxy butyl acetate) | 1,400 | parts by weight |
| acetophenone based photo polymerization initiator | 40 | parts by weight |
| thioxanthone based sensitizer | 10 | parts by weight |

The preparation of the pigment dispersion compositions (specimens 15 to 18) was carried out as follows. First, a pigment (for the blue pixel, a pigment derivative is also included), a pigment dispersing agent, a binder resin, and a solvent were dispersed by an annular type bead mill (bead diameter=0.3 mm, bead material=zirconium oxide) at 25° C. for 5 hours so as to prepare a pigment dispersion material. For the pigment dispersion materials accordingly obtained, the average particle size immediately after the preparation was measured according to the measurement method described in the example 1. Results are shown in the below-mentioned table 3. Furthermore, the viscosity of the pigment dispersion materials was measured immediately after the dispersion by a viscometer (produced by Shibaura System Corp., VISMETRON viscometer VDA-L). Results are shown in the below-mentioned table 3.

Next, a reactive composition comprising a reactive compound, an acetophenone based photo polymerization initiator, and a thioxanthone based sensitizer, and the above-mentioned pigment dispersion materials were mixed by a two axes mixer having a frame type blade, and further, mixed by a bead mill so as to obtain the pigment dispersion compositions (specimens 15 to 18).

In the same manner as the above-mentioned pigment dispersion compositions except that a binder resin is not contained, a pigment dispersion composition (specimen 19) comprising a set of three colors for a red pixel, a green pixel, and a blue pixel was prepared. For the specimen 19, the average particle size and the viscosity of the pigment dispersion material were measured. Results are shown in the below-mentioned table 3.

(3) Evaluation of the Pigment Dispersion Compositions for a Color Filter

Using the 5 kinds of the pigment dispersion compositions (specimens 15 to 19) prepared as mentioned above, the below-mentioned photolithography step was repeated in the order of a red pixel, a green pixel, and a blue pixel so as to form a coloring layer.

- spin coat (application thickness = 1.5 μm (when dry))

- pre-baking (110° C., 3 minutes)

- exposure (exposure amount 200 mJ)

- development (developing liquid = aqueous solution of a potassium hydroxide)

- post-baking (200° C., 30 minutes)

In the coloring layer formation, the time needed for the development, the edge precision of the formed coloring layer pattern, the residue generation state at the time of the development are shown in the below-mentioned table 3.

TABLE 3

| | | Average particle size | Viscosity of the | Coloring layer pattern formation | | |
|---|---|---|---|---|---|---|
| Specimen | Molecular weight of the binder resin | of the pigment (μm) | pigment dispersion material (cp) | Developing time (hour) | Edge precision of the pattern | Residue generation of the pattern |
| 15 | 10000 | 0.1 | 11 | 5 | Good | None |
| 16 | 50000 | 0.1 | 13 | 8 | Good | None |
| 17 | 60000 | 0.15 | 20 | 15 | Poor | Slightly generated |
| 18 | 5000 | 0.5 | 80 | 10 | Poor | Much generated |
| 19 | — | 0.1 | 11 | 6 | Good | Much generated |

As shown in the table 3, the pigment dispersion materials (specimens 15 and 16) using a binder resin with a molecular weight in a range from 10,000 to 50,000 have a sufficiently low viscosity of 11 to 13 cp, and a 0.1 μm pigment average particle size. The pigment dispersion compositions (specimens 15 and 16) using the pigment dispersion materials can form a pattern with a good edge precision in a short developing time, without generation of the residue.

On the other hand, the pigment dispersion composition (specimen 17) using a binder resin with a molecular weight of 60,000 has a poor pattern edge precision of the formed coloring layer, and generation of the residue was slightly observed.

Moreover, the pigment dispersion composition (specimen 18) using a binder resin with a molecular weight of 5,000 has a poor pattern edge precision of the formed coloring layer, and generation of the residue was observed considerably.

In contrast, the pigment dispersion composition (specimen 19) without using a binder resin has a remarkable generation of the residue, and it is of a level insufficient for providing the practical use.

Example 4

(1) Preparation of a Binder Resin

In the same process as in the example 1 except that an epoxy group was introduced, a binder resin 11 (molecular weight=20,000) was prepared.

(2) Preparation of a Pigment Dispersion Composition for a Color Filter

Next, using the above-mentioned binder resin 11, 6 kinds of pigment dispersion compositions for a color filter (specimens 20 to 25) for a blue pixel with the below-mentioned compositions were prepared.

(Pigment Dispersion Composition for a Blue Pixel)

| | |
|---|---|
| blue pigment (HELIOGEN BLUE L6700F produced by BASF Japan Corp.) | 100 parts by weight |
| phthalocyanine based pigment derivative (SOLSPERSE 5000 produced by Zeneca Co., Ltd.) | 10 parts by weight |
| binder resin 11 | 90 parts by weight |
| reactive compound - cresol novolak type epoxy resin (EPICOAT 180S70 produced by Yuka Shell Epoxy Corp.) | 120 parts by weight |
| solvent (propylene glycol methyl ether acetate) | 350 parts by weight |
| curing agent (trimellitic acid) | 30 parts by weight |

The preparation of the pigment dispersion compositions (specimens 20 to 25) was carried out as follows. First, a pigment, a pigment derivative, a binder resin, and a solvent were dispersed by an annular type bead mill (bead diameter=0.3 mm, bead material=zirconium oxide) at 25° C. for 5 hours so as to prepare a pigment dispersion material (viscosity=about 5,000 cp).

Next, a reactive composition comprising a reactive compound, and a curing agent, and the above-mentioned pigment dispersion materials were mixed by the conditions shown in the below-mentioned table 4 from the below-mentioned mixing conditions 1 to 6 so as to obtain the pigment dispersion compositions (specimens 20 to 25).

Mixing Condition 1:
  mixing by a two axes mixer having a frame type blade for 1 hour
  mixing by a bead mill for 1 hour
    (ceramic beads of a 0.5 mm diameter were used)

Mixing Condition 2:
  mixing by a two axes mixer having a frame type blade for 1 hour
  mixing by a bead mill for 1 hour
    (ceramic beads of a 1 mm diameter were used)
  mixing by a three rolls mill for 1 hour Mixing Condition 3:
  mixing by a two axes mixer having a frame type blade for 1 hour
  mixing by a bead mill for 1 hour
    (ceramic beads of a 0.5 mm diameter were used)
  mixing by a three rolls mill for 1 hour Mixing Condition 4:
  mixing by a two axes mixer having a frame type blade for 1 hour
  mixing by a bead mill for 1 hour
    (ceramic beads of a 0.3 mm diameter were used)
  mixing by a three rolls mill for 1 hour Mixing Condition 5:
  mixing by a two axes mixer having a frame type blade for 1 hour
  mixing by a three rolls mill for 1 hour Mixing Condition 6:
  mixing by a one axis propeller mixer for 1 hour
  mixing by a bead mill for 1 hour
    (ceramic beads of a 0.5 mm diameter were used)
  mixing by a three rolls mill for 1 hour (3) Evaluation of the Pigment Dispersion Compositions for a Color Filter With the 6 kinds of the pigment dispersion compositions (specimens 20 to 25) prepared as mentioned above, pattern printing was carried out by intaglio printing. The printing shape was evaluated as shown in the below-mentioned table 4.

TABLE 4

| Specimen | Mixing condition | Printing shape |
|---|---|---|
| 20 | Condition 1 [two axes mixer/bead mill (0.5 mm)] | Good |
| 21 | Condition 2 [two axes mixer/bead mill (1.0 mm)/three rolls] | Good |
| 22 | Condition 3 [two axes mixer/bead mill (0.5 mm)/three rolls] | Good |
| 23 | Condition 4 [two axes mixer/bead mill (0.3 mm)/three rolls] | Slightly poor |
| 24 | Condition 5 [two axes mixer/three rolls] | Slightly poor |
| 25 | Condition 6 [propeller mixer/bead mill (0.5 mm)/three rolls] | Poor |

As shown in the table 4, the pigment dispersion compositions (specimens 20 to 22) prepared by the mixing conditions (1 to 3) including the mixing operation by the two axes mixer for 1 hour, and the mixing operation by the bead mill using ceramic beads of a 0.5 mm or more diameter for 1 hour have a good printing shape by intaglio printing.

However, the pigment dispersion composition (specimen 23) prepared by the mixing condition (4) using ceramic beads of a less than 0.5 mm diameter in the mixing operation by the bead mill, and the pigment dispersion composition (specimen 24) prepared by the mixing condition (5) without the mixing operation by a bead mill have a slightly poor printing shape by intaglio printing.

Moreover, the pigment dispersion composition (specimen 25) prepared by the mixing condition (6) using a one axis propeller mixer instead of a two axes mixer has separation of the pigment and the resin component, and a poor printing shape by intaglio printing.

What is claimed is:

1. A pigment dispersion composition for a color filter comprising at least a chromatic organic pigment, a pigment dispersing agent, a binder resin, a reactive compound, and a solvent,
  wherein the binder resin is a compound having a pigment adsorbing block containing a pigment adsorbing group and not containing a reactive group, and a reactive block containing a reactive group and not containing a pigment adsorbing group, wherein the binder resin molecular weight is in a range from 10,000 to 50,000, and the reactive block has an unsaturated double bond in a reactive group as well as contains a carboxyl group, and wherein the pigment adsorbing block is a trunk polymer, the reactive block is a branch polymer, and the average particle size of the chromatic organic pigment is 0.15 μm or less.

2. The pigment dispersion composition for a color filter according to claim 1, wherein the reactive block further contains a hydroxyl group.

3. The pigment dispersion composition for a color filter according to claim 1, wherein the reactive compound is a photo reactive compound and/or a thermally reactive compound, having a polyfunctional monomer with an unsaturated double bond.

4. The pigment dispersion composition for a color filter according to claim 3, wherein the reactive compound further contains an epoxy group.

5. The pigment dispersion composition for a color filter according to claim 1, further containing a polyvalent carboxylic acid group or an acid anhydride thereof, wherein the binder resin has an epoxy group as a reactive group of the reactive block, and the reactive compound is a photo reactive compound and/or a thermally reactive compound containing an epoxy group.

6. A method for producing a pigment dispersion composition for a color filter that is the pigment dispersion composition for a color filter according to claim 1, wherein a pigment dispersion material of a 0.15 μm or less average particle size produced by kneading a mixture of an organic pigment, a pigment dispersing agent, a binder resin, and a solvent by an annular type medium dispersing machine using ceramic beads of a 0.5 mm or less diameter, and a reactive composition containing a reactive compound and as needed a solvent, are mixed.

7. The method for producing the pigment dispersion composition for a color filter according to claim 6, wherein the mixing operation for the pigment dispersion material and the reactive composition comprises a step of mixing by a kneading machine having a plurality of rotation axes and a frame type blade, and a step of dispersing by a bead mill using ceramic beads of a 0.5 to 2 mm diameter.

8. The method for producing the pigment dispersion composition for a color filter according to claim 7, further comprising a dispersion step by a three rolls mill after the dispersion steps.

9. A color filter for a display comprising a supporting member, and a plurality of coloring layers formed on the supporting member by a predetermined pattern, wherein the coloring layers are formed with any of the pigment dispersion compositions for a color filter according to claim 1.

* * * * *